United States Patent [19]

Greenwood et al.

[11] 3,799,193
[45] Mar. 26, 1974

[54] COMBINATION VALVE AND COMPONENT THEREOF

[75] Inventors: Roger Greenwood, Valencia; Thomas Roberts, North Hollywood, both of Calif.

[73] Assignee: International Telephone and Telegraph Corporation, New York, N.Y.

[22] Filed: Dec. 20, 1971

[21] Appl. No.: 210,007

[52] U.S. Cl............................. 137/525, 137/625.64
[51] Int. Cl...................... F16k 15/00, F16k 11/02
[58] Field of Search............ 137/525, 512.15, 512.4, 137/625.64

[56] References Cited
UNITED STATES PATENTS

| 480,400 | 8/1892 | DeWolfe | 137/525 X |
|---|---|---|---|
| 597,954 | 1/1898 | Cartwright | 137/525 X |
| 2,707,074 | 4/1955 | Tussey | 137/525 X |
| 3,384,113 | 5/1968 | Pennisi | 137/525 |
| 2,651,322 | 9/1953 | Hendry | 137/525 |
| 3,632,043 | 1/1972 | Kirschmann | 137/525 X |
| 2,662,485 | 12/1953 | Ilfrey | 137/525 X |
| 3,179,124 | 4/1965 | Haring | 137/525 X |

Primary Examiner—Henry T. Klinksiek
Assistant Examiner—Robert J. Miller
Attorney, Agent, or Firm—A. Donald Stalzy

[57] ABSTRACT

A pilot operated three-way diaphragm valve having a vent valve including a closed end metal cylinder having an open end to receive the three-way valve exhaust. The cylinder has holes through it. A rubber tube is assembled over the cylinder. The cylinder and tube have an interference fit. The tube seals the cylinder holes shut until the differential pressure across the vent valve to cause venting rises to a predetermined pressure. The tube also has holes which do not lie in registration with those of the cylinder. Moreover, the tube holes are staggered relative to the cylinder holes.

15 Claims, 15 Drawing Figures

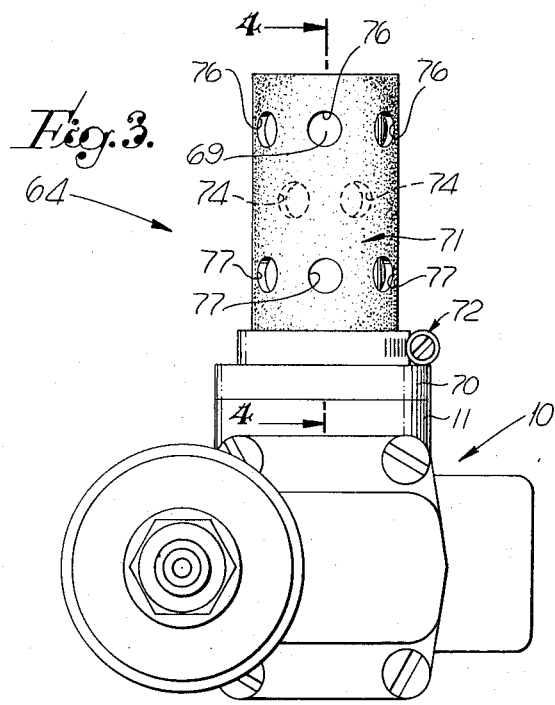
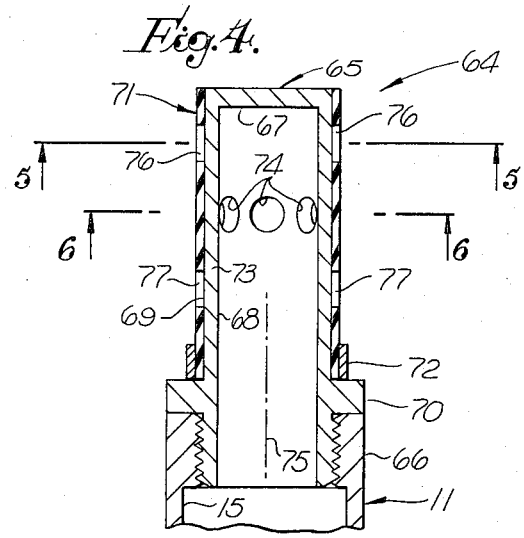
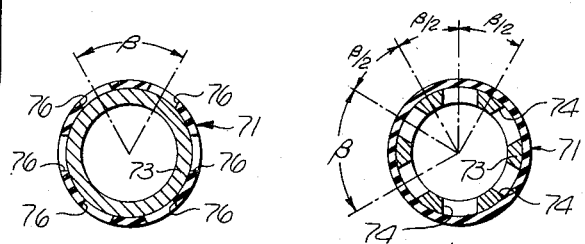
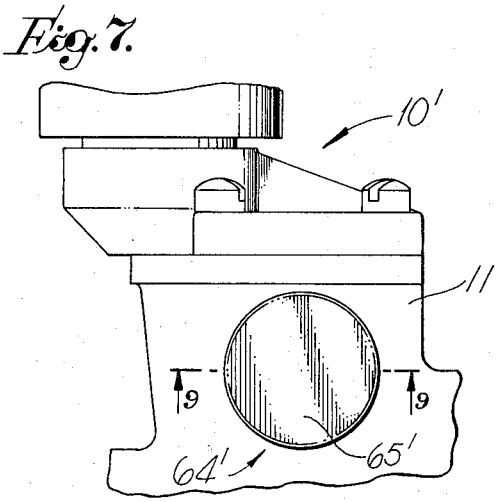
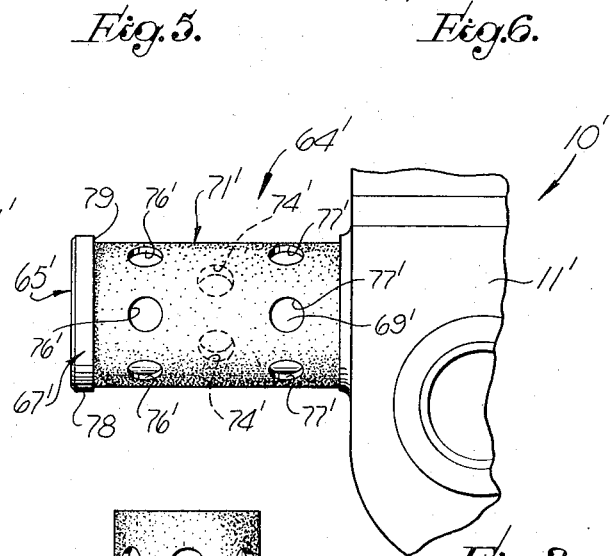
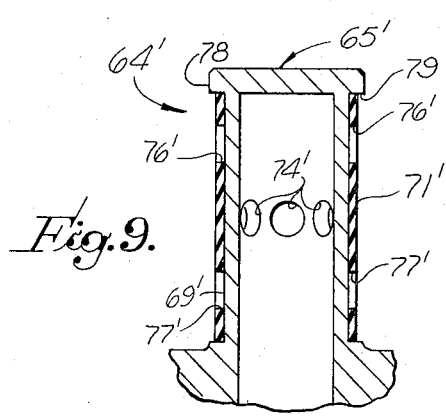
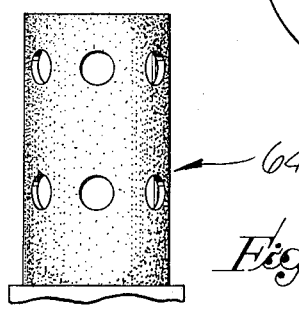

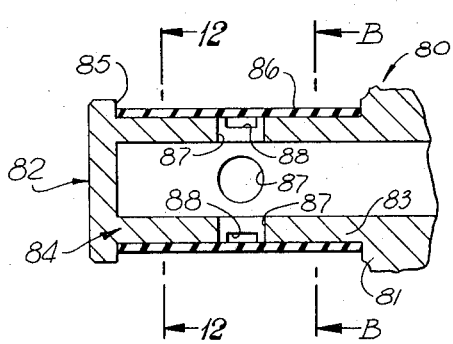
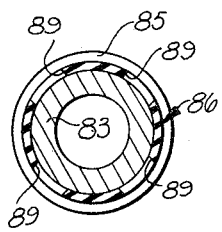
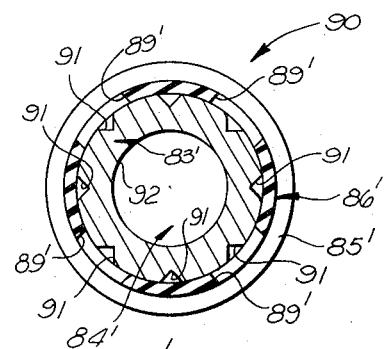
Fig. 11.  Fig. 12.  Fig. 13.
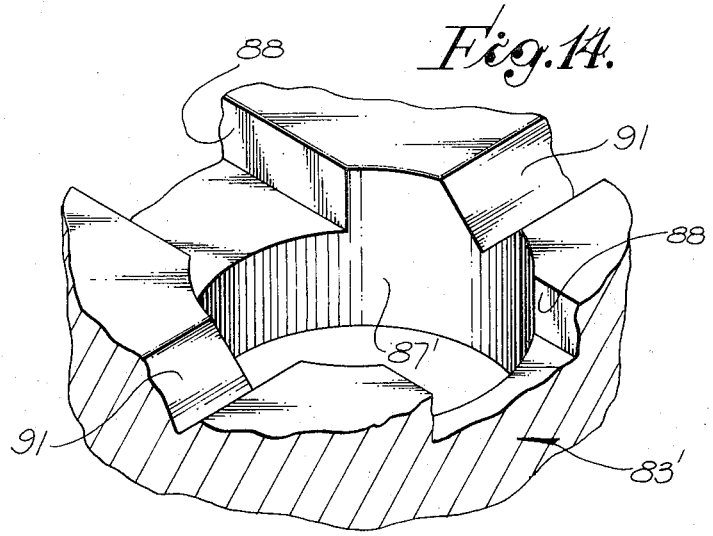
Fig. 14.
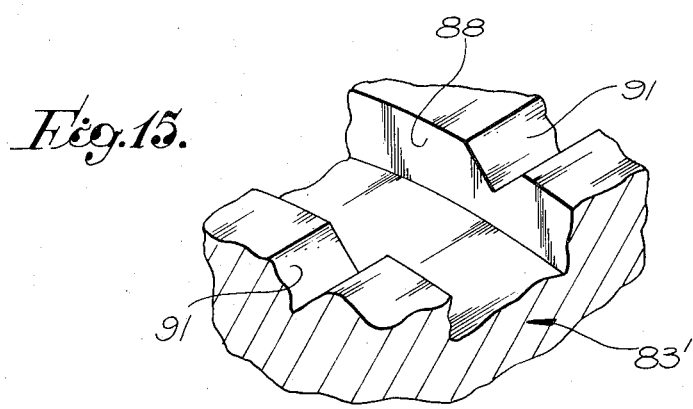
Fig. 15.

COMBINATION VALVE AND COMPONENT THEREOF

BACKGROUND OF THE INVENTION

This invention relates to fluid pressure responsive devices, and more particularly, to a fluid pressure operated valve and to a vent valve which may be used with or without the fluid pressure operated valve.

The present invention will have many applications not disclosed herein and, therefore, is not to be limited to those applications disclosed. However, the invention will be found to be especially useful when employed in an anti-skid air brake system.

In prior art air brake systems, it is common to enclose a vented pneumatic valve in a cumbersome and expensive molded rubber housing to keep the pneumatic valve as free from dirt, moisture and any other external contamination as possible. Further, spring biased vent valves of the type disclosed in copending application Ser. No. 185,235 filed Sept. 30, 1971, by J. Etcheverry and J. Doolittle for PNEUMATIC DUMP VALVE have not proved successful. In addition, it is a serious disadvantage of prior art vent valves that they cannot break free from ice therearound.

Prior art pneumatic valves also dump air at an undesirably low rate. Note will be taken that it is especially important in an anti-skid air brake system that fast dumping take place to prevent a skid.

Prior art vent valves have poor endurance and short lives.

Prior art vent valves are also expensive to construct.

SUMMARY OF THE INVENTION

In accordance with the present invention, the above-described and other disadvantages of the prior art are overcome by providing a vent valve including a rigid valve body having an internal chamber therein to contain a fluid under pressure except when vented. The valve body has a wall with at least one hole therethrough which is sealed shut in the absence of differential pressure across the vent valve. The hole is sealed off by a flexible elastic membrane which is held in pressure contact with a portion of the external surface of the valve body which extends around the hole. The pressure contact is maintained by stretching the membrane over the hole in a direction approximately perpendicular to the membrane thickness. The membrane is then constructed to balloon and to expand outwardly away from the valve body to permit venting when an adequate pressure differential across the vent valve exists.

According to an outstanding feature of the present invention, the vent valve body and the membrane are hollow concentric tubes having an interference fit.

Still another outstanding feature of the invention resides in the use of plural staggered holes in the vent valve body and the elastic tube.

From the foregoing, it will be appreciated that the vent valve of the present invention is easy and inexpensive to construct. Further, it easily breaks ice away because the elasticity and flexibility of the elastic tube permits it to hunt for the weakest place in the ice and crack it at that place.

An outstanding, yet completely unexpected, advantage of the present invention is that the combination of a vent valve with a fluid pressure operated valve increases the dumping rate. This phenomenon appears to be inexplicable.

Another outstanding and unexpected advantage of the present invention is that the staggered holes increase endurance and useful life. Further, in some cases, without a certain hole arrangement, the elastic tube may balloon and burst.

The above-described and other advantages of the present invention will be better understood from the following detailed description when considered in connection with the accompanying drawings.

BRIEF DESCRIPTION OF THE DRAWINGS

In the drawings which are to be regarded as merely illustrative:

FIG. 3 is a top plan view of the combination valve shown in FIGS. 1 and 2;

FIG. 4 is a vertical sectional view through a vent valve taken on the line 4—4 shown in FIG. 3;

FIG. 5 is a transverse sectional view of the vent valve taken on the line 5—5 shown in FIG. 4;

FIG. 6 is a transverse sectional view of another portion of the vent valve taken on the line 6—6 shown in FIG. 4;

FIG. 7 is a side elevational view of another embodiment of the vent valve of the present invention;

FIG. 8 is an end elevational view of the valve shown in FIG. 7;

FIG. 9 is a longitudinal sectional view of the vent valve taken on the line 9—9 shown in FIG. 8;

FIG. 10 is a broken away side elevational view of another embodiment of the present invention;

FIG. 11 is a longitudinal sectional view of still another embodiment of the present invention;

FIG. 12 is a transverse sectional view of the embodiment shown in FIG. 11 taken on the line 12—12;

FIG. 13 is a transverse sectional view of still another embodiment of the present invention;

FIG. 14 is a greatly enlarged perspective view of a small portion of a rigid cylinder shown in FIG. 11 which surrounds a hole therethrough; and FIG. 15 is another greatly enlarged perspective view of another small portion of the rigid cylinder in the vicinity of a groove therearound, as shown in FIG. 11.

DESCRIPTION OF THE PREFERRED EMBODIMENTS

Figure 1:
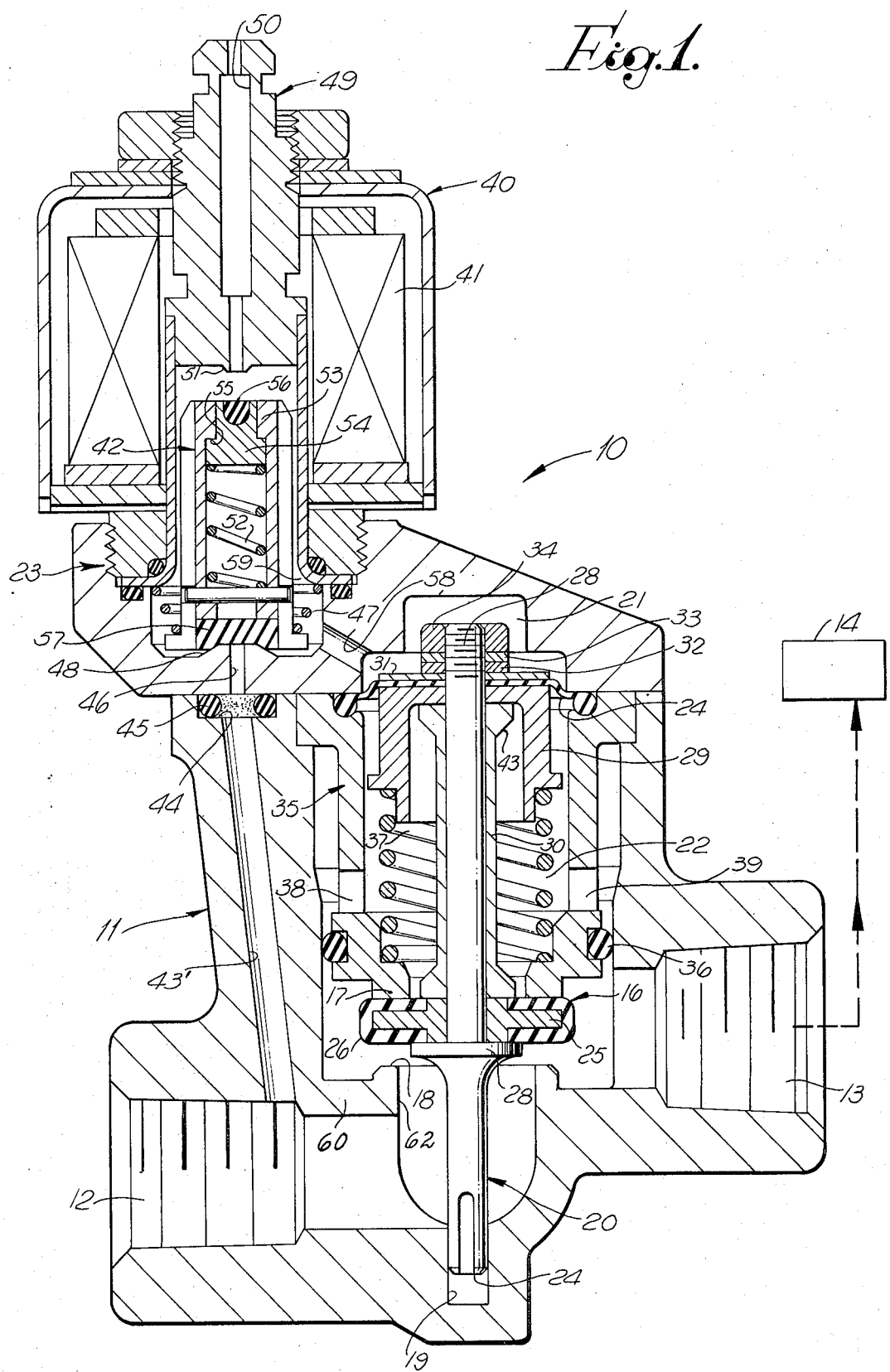
FIG. 1 is a vertical sectional view of a portion of the combination valve of the present invention.
Figure 2:
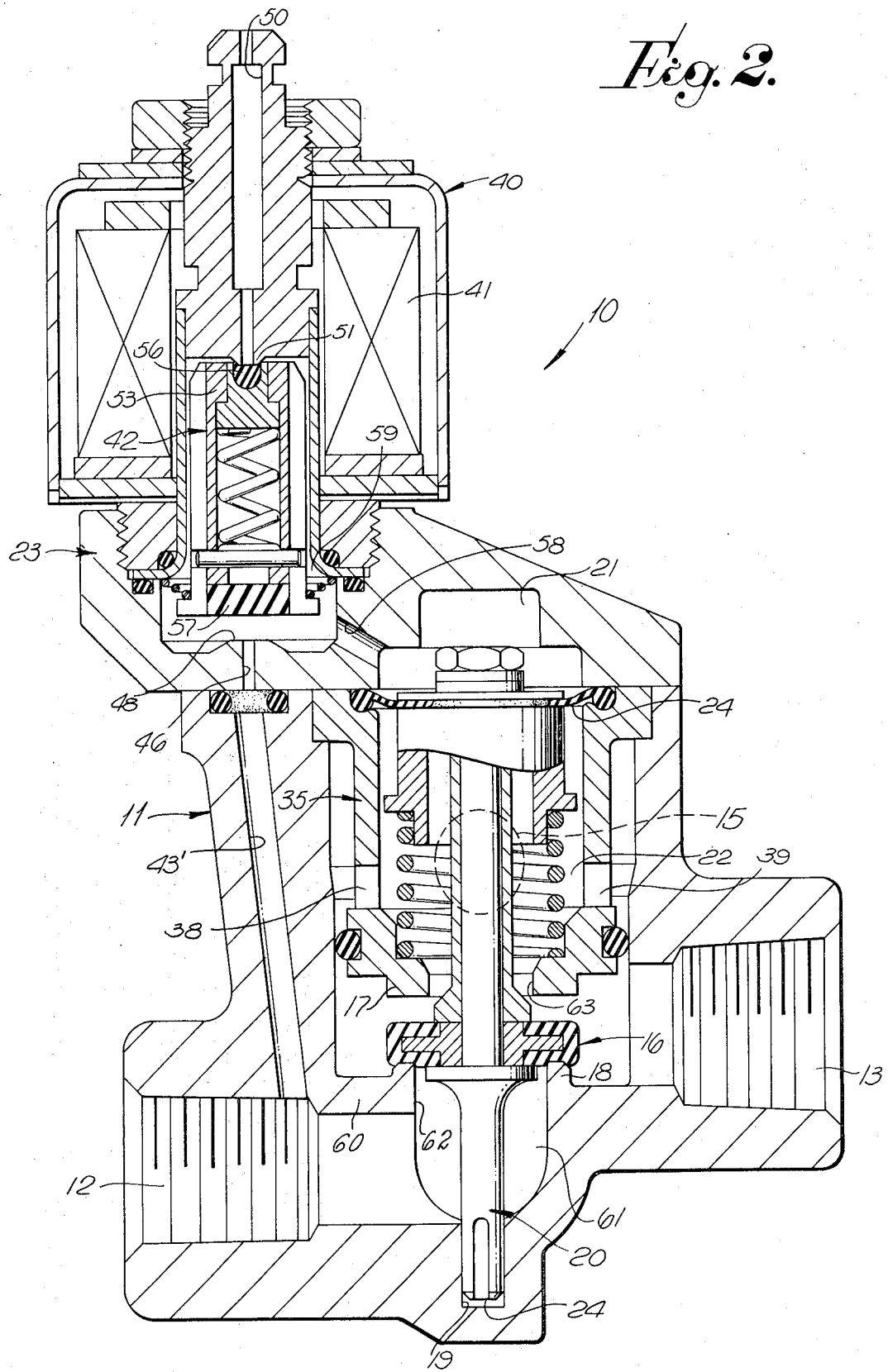
FIG. 2 is a sectional view of the combination valve identical to FIG. 1 except that certain component parts thereof are shown in a different operative position.

The Three-Way Valve of FIGS. 1 and 2

According to the one feature of the invention, the use of a vent valve of a particular construction is highly advantageous. It is also an outstanding advantage of the present invention that this vent valve may be used with a three-way valve 10 shown in FIG. 1 in the drawings. However, the vent valve is not, in fact, shown in either one of FIGS. 1 and 2.

In FIG. 1, three-way valve 10 is shown including a valve body 11 having an inlet port 12, an outlet port 13 connected to an anti-skid air brake system 14, and an exhaust outlet port 15.

A valve disc 16 rests either against a seat 17 or against a seat 18. Valve disc 16 may be moved from against seat 17 to against seat 18 and vice versa selectively.

Valve body 11 haa recess 19 therein in which a valve stem 20 is slidable vertically, as viewed in FIG. 1. Recess 19, thus, guides vertical movement of valve stem 20 in the direction of its axis. Valve stem 20 is moved when the pressure in an actuating chamber 21 exceeds the pressure in an exhaust chamber 22.

Actuating chamber 21 is generally defined between a portion of a casing 23 and a diaphragm 24.

Valve disc 16 includes a rigid plate 25 and a conventional soft covering 26 therefor. Plate 25 has a hole 27 therethrough through which valve stem 20 projects. Valve stem 20 has a flange 28 against which plate 25 abuts. Covering 26 is bonded to plate 25.

A cup 29 is seated against the lower surface of diaphragm 24. As is conventional, diaphragm 24 is flexible.

A sleeve 30 is slidable over valve stem 20 to the position shown between plate 25 and cup 29.

Washers 31, 32 and 33 are slidably engaged with valve stem 29 in an upward vertical succession immediately above the upper surface of diaphragm 24. A nut 34 is threaded onto the upper end of valve stem 20 and is screwed down tight so as to hold that portion of valve stem 20 between flange 28 and nut 34 in tension. In that location, thus, plate 25, sleeve 30, cup 29, and washers 31, 32 and 33 lie in axial compression. The same is true of diaphragm 24.

A generally cylindrical body 35 includes valve seat 17 and is fixed inside valve body 11 in a position approximately concentric with a chamber therein. As will be explained, exhaust chamber 22 may be considered to be both the interior of body 35 and the exterior space therearound between it and valve body 11 above an O-ring 36 carried by body 35. This is true because body 35 has holes 38 and 39 therethrough which provide free and open communication from the interior of body 35 to the exterior thereof.

A coiled spring 37 is maintained in compression between the lower end of cup 29 and the lower end of body 35. Coiled spring 37, thus, keeps valve disc 16 in engagement with valve seat 17 unless the pressure in actuating chamber 21 is enough larger than that in exhaust chamber 22 to overcome the force of coiled spring 37.

Normally, air under pressure is supplied to port 12. System 14 may be entirely conventional. System 14 may also include a diaphragm operated set of brakes which receives air from port 13. Thus, it may be said that valve disc 16 with valve seat 18 forms a valve which is normally opened. This is true also because, as will be explained, pressure supplied through inlet port 12 is required inside actuating chamber 21 in order to place valve disc 16 in sealing engagement with valve seat 18.

The valve 10 is a pilot operated diaphragm valve. The diaphragm is the diaphragm 24. The pilot valve is indicated at 40 including an operating solenoid 41, and a plunger 42.

Valve body 11 has a passageway 43' extending from inlet port 12 to a counterbore 44 in which an O-ring 45 is located between valve body 11 and casting 23. Casting 23 has an opening 46 therethrough. A chamber 59 is provided around plunger 42.

Casting 23 has a valve seat 48 around opening 46. A fitting 49 is fixed concentrically with solenoid 41 and has an outlet passage 50. Fitting 49 also has a valve seat 51. Plunger 42 is, thus, vertically slidable from a position in engagement with valve seat 51 to a position in engagement with valve seat 48, and vice versa. Thus, either opening 50 or opening 46 are closed, but both of these openings 50 and 46 are not closed at the same time.

Pressure on valve seat 51 can be held to a predetermined amount by the use of a coiled spring 52, as shown in FIG. 1.

Plunger 42 includes a hollow cylindrical housing 53 in which a plug 54 is slidable. Plug 54 is prevented from moving outwardly of cylinder 53 by an internal shoulder 55. Spring 52 biases plug 54 against shoulder 55. A soft valve material 56 is fixed in the end of plug 54 to engage valve seat 51.

OPERATION

In the operation of the strucures shown in FIGS. 1 and 2, when solenoid 41 is deenergized, spring 47 holds soft valve material 57 fixed relative to plunger 42 in engagement with valve seat 48. This means that material 56 is spaced from valve seat 51 and actuating chamber 21 is vented to the atmosphere through a passageway 58 in casting 23, through chamber 59 surrounding plunger 42, and outwardly through opening 50.

The fluid pressure in exhaust chamber 22 never is below atmospheric. Thus, in the case shown in FIG. 1, there is no differential pressure across diaphragm 24, and the preponderant force of spring 37 brings vlave disc 16 into engagement with valve seat 17 and prevents any fluid entering inlet port 12 from also entering exhaust chamber 22. At the same time, valve disc 16, as shown in FIG. 1, is spaced from valve seat 18 and fluid or air under pressure is permitted to enter inlet port 12 and exit from outlet port 13 through the space between valve disc 16 and valve seat 18.

As will be apparent from the foregoing, FIG. 1 shows the position of the parts when solenoid 41 is denergized and FIG. 2 shows the position of the parts when the solenoid 41 is energized.

In FIG. 2, when solenoid 41 is energized, plunger 42, including cylinder 53, which is made of a magnetic material, rises and material 56 engages valve seat 51. Opening 50, which acts as a vent, is nevertheless ineffective as a vent when material 56 engages valve seat 51. Thus, air under pressure enters chamber 59 through passageway 43 and opening 46 because plunger 42 has moved upwardly spacing material 57 from valve seat 48. Air from inlet port 12 entering chamber 59 through passageway 43 and opening 46 also enters actuating chamber 21 through passageway 58.

As shown in FIG. 2, valve body 11 has a web 60 which partially defines an inlet chamber 61 surrounding valve stem 20. The upper end of chamber 61 has a cylindrical bore 62 which forms an inlet chamber port through web 60 inside valve seat 18.

Due to the fact that the area on top of diaphragm 24 which is not clamped between casting 23 and valve body 11 is greater than $\pi D^2/4$, where D is the diameter of bore 62, the line pressure in actuating chamber 21 causes valve means 16 to engage valve seat 18. This prevents the flow of air from inlet port 12 to outlet port 13. On the other hand, air entering outlet port 13 is vented. This air passes through an opening 63 through the lower end of body 35 inside valve seat 17. Air entering outlet port 13 may then pass from exhaust chamber 22 to the atmosphere, as will be described. However, the first step in reaching the atmosphere is to pass through holes 38 and/or 39 through the wall of body 35. The air passing through holes 38 and 39 will then eventually flow through exhaust chamber port 15 and be vented by a vent valve, to be described.

The Vent Valve of FIGS. 3, 4, 5 and 6

In FIG. 3, a vent valve 64 is shown which is constructed in accordance with the present invention. Vent valve 64 is sealed to or fixed integrally with the valve body 11 of three-way valve 10. Alternatively, vent valve 64 may include a blind ended tube 65 which is threaded into a cylindrical projection 66 of valve body 11 as shown in FIG. 4. Exhaust chamber port 15 is, thus, positioned as indicated in FIG. 4. Tube 65 has a circular disc shaped end plate 67 which closes the upper end thereof as viewed in FIG. 4. Tube 65 has a cylindrical internal and external surfaces 68 and 69, respectively. Tube 65 has a flange 70 which abuts the upper end of projection 66, as viewed in FIG. 4.

Tube 65 is made of a rigid material. For example, tube 65 may be made of metal.

A rubber tube 71, opened at both ends, is positioned over tube 65. Rubber tube 71 is, thus, both flexible and elastic.

Although it is not necessary or desirable for rubber tube 71 to retain its shape should it be removed from tube 65, if it would retain its shape, its inside diameter would be less than the diameter of the external surface 69 of tube 65. Thus, tubes 65 and 71 have an interference fit. Rubber tube 71 is, thus, stretched in circumferential tension around tube 65.

As shown in both FIGS. 3 and 4, the lower end of tube 71 is clamped to the external surface 69 of tube 65 by an entirely conventional hose clamp 72.

As shown in all of the FIGS. 3, 4 and 5, tube 65 has a cylindrical wall 73 above flange 70 through which six holes 74 are positioned. Although it is not absolutely required, holes 74 may be circular, and they may all be of the same diameter. All of the holes 74, thus, have axes. Due to the fact that internal tube surface 68 is cylindrical, this surface has a symmetrical axis 75. As shown, cylindrical surfaces 68 and 69 are concentric. The axes of holes 74 all lie in a single plane which is perpendicular to axes 75. The axis of each hole 74 is then spaced an angle $\beta$, as shown in FIG. 6, from the hole 74 on each side thereof. The number of holes may be varied. However, in the case of six holes, $\beta$ equals 60°. In other words, the holes 74 are uniformly positioned or have equal spacings around the wall 73 of tube 65. The same is true of holes 76 and 77 which extend completely through tube 71. That is, again, holes 76 are circular, are of the same sizes and have axes lying in a plane perpendicular to axis 75. However, the holes 76 are spaced from the holes 74 so that holes 76 do not lie in substantial registration with holes 74. The same is true of holes 77. That is, holes 77 do not substantially lie in registration with holes 74. Moreover, holes 77, too, are circular, of the same size and have axes which lie in a plane perpendicular to axes 75. Holes 74 are located along the length of tube 65 in between the parallel planes of the axes of holes 76 and 77. The drawing of FIG. 4 may be considered a scale drawing, if desired. However, the invention is by no means limited to the relative dimensions indicated in FIG. 4.

As shown in FIG. 5, holes 76 may be equally or uniformly spaced. The axes of each pair of immediately adjacent holes 76 may be located at the angle $\Delta$, shown in FIG. 5. It will be noted that the positions of the axes of holes 74 in FIG. 6 are not the same as the axes of holes 76 shown in FIG. 5. Thus, so to speak, each hole 74 is located midway between each pair of holes 76, shown in FIG. 5, although the sections of FIGS. 5 and 6 are obviously taken in different vertical planes, as viewed in FIG. 4. To say it another way, the holes 74 are staggered relative to holes 76. Moreover, since holes 77 are in, more or less, vertical alignment with holes 76, holes 74 are thus also staggered relative to holes 77.

THE ALTERNATIVE EMBODIMENT OF FIGS. 7, 8 AND 9

In FIG. 7, a three-way valve 10' is shown having a valve body 11'. A vent valve 64' is mounted on valve body 11', vent valve 64' having a rigid tube 65'. Three-way valve 10' may be identical to valve 10 except that it has valve body 11' which is fixed integrally with rigid tube 65'.

As shown in FIG. 8, tube 65' has a surface 69' which may be identical to surface 69 of tube 65. Vent valve 64' may be identical to vent valve 64 with three exceptions. The first exception is that tube 65' is made integral with valve body 11'. The second exception is that hose clamp 72 has been omitted. The third exception is that plate 67' is identical to plate 67 except that plate 67' is circular and has an outer cylindrical surface 78 concentric with surface 69', the diameter of surface 78 being greater than the diameter of surface 69'. Plate 67', thus, provides a flange 79 which projects radially outwardly from the axis of surface 69' beyond surface 69' to retain a rubber tube 71' on surface 69'. For assembly purposes, the diameter of surface 78 need be only great enough to keep tube 71' on surface 69'. Normally, thus, tube 71' can be of a size such that it can be slipped over surface 78 and assembled on surface 69' in the position shown in FIG. 8.

Tube 65' has holes 74' which may be identical to holes 74. Tube 71' has holes 76' and 77' which may be identical to holes 76 and 77, respectively. See both FIGS. 8 and 9.

THE ALTERNATIVE EMBODIMENT OF FIG. 10

Still another alternative embodiment of the invention is shown in FIG. 10. This embodiment is indicated at 64''. This embodiment is identical to the embodiment of FIGS. 1, 2, 3, 4, 5 and 6, except that hose clamp 72 has been omitted. Vent valve 64'' is illustrated to demonstrate that in some cases, there will be no requirement whatsoever for hose clamp 72.

THE ALTERNATIVE EMBODIMENT OF FIGS. 11 AND 12

In FIG. 11, a portion of a three-way valve 80 is shown including only a portion of a valve body 81 integral with a rigid tube 82. In this embodiment, rigid tube 82 includes a cylindrical wall 83 integral with valve body 81, as before, and a plate 84 integral with wall 83 which closes the end of tube 82 and has a flange projection 85, as before, to retain a rubber tube 86 in circumferential tension around the cylindrical surface of wall 83.

This is true in the case of all of the embodiments disclosed herein.

Wall 83 has four holes 87 extending completely therethrough rather than six holes. Holes 87 are uniformly spaced around tube 82, as before. However, each pair of immediately adjacent holes have symmetrical axes lying in a plane perpendicular to the axis of tube 82 which are angularly spaced through an angle of 90°.

Tube wall 83 has a circumferential groove 88 which extends completely around the circumference thereof and intercepts each hole 87.

As shown in FIG. 12, tube 86 has four uniformly spaced holes 89. But again, comparison of FIGS. 11 and 12 will reveal that holes 87 are staggered relative to holes 89.

A section on the line B—B shown in FIG. 11 would be identical to that shown in FIG. 12.

THE ALTERNATIVE EMBODIMENTS OF FIGS. 13, 14 AND 15

A section of an alternative embodiment of the vent valve of the present invention is indicated at 90 in FIG. 13. Vent valve 90 is identical to the vent valve shown in FIGS. 11 and 12 with the following exceptions. For example, vent valve 90 has a plate 84' with a flange projection 85'. Plate 84' may be identical to plate 84. Flange 85' may be identical to flange 85. Vent valve 90 includes a rubber tube 86' having holes 89' therethrough. Tube 86' may be identical to tube 86. It then follows that holes 89' may be identical to holes 89. Comparison of FIGS. 11 and 12 with FIG. 13 will reveal that the only change in the vent valve 90 over the structures shown in FIGS. 11 and 12 relate to the addition of grooves 91 in the external surface of tube wall 83' which extend in the direction of the symmetrical axis of the internal cylinder surface 92 of tube wall 83'. Wall 83' is otherwise identical to wall 83. Note will be taken that at least one groove 91 intercepts each rubber tube hole 89'. This makes it possible to maintain the vent valve 90 "cracked open" for any finite exhaust pressure, or for a zero exhaust pressure, gage. This may be desirable at times to provide a controlled leak to drain back pressure.

Assuming that FIG. 11 is an accurate representation of one longitudinal sectional view through vent valve 90, FIG. 13 could represent sections thereof indicated on both the lines 12—12 and B—B shown in FIG. 11.

As shown in FIG. 14, rigid tube wall 83' may be provided with four holes 87' identical to holes 87 shown in FIG. 11.

All of the grooves 91 preferably should either intercept groove 88 or they preferably should intercept a hole 87'. As shown in FIGS. 13 and 14, alternate grooves intercept hole 87'. The other alternate set of grooves 91 intercept groove 88, as shown in FIG. 15.

Note will be taken that the rubber tube disclosed herein need not actually be made of rubber, but it is preferably made of a rubber-like material.

In many respects, the drawings may be considered as scale drawings, but as stated previously, the invention is by no means limited to the relative dimensions illustrated.

This invention has more than one feature. The invention is, therefore, not limited to any particular feature. Any one feature may be employed completely by itself. Alternatively, any one feature of the present invention may be employed with one or more or all of the other features without departing from the scope of the present invention.

Alternatively, if grooves 91 are employed as shown in FIGS. 13, 14 and 15, those grooves 91 which do or do not intercept rubber tube holes 89' may be omitted, if desired.

ADVANTAGES

From the foregoing, it will be appreciated that one feature of the invention resides in the interference fit between the rigid and elastic tubes disclosed herein.

Still another feature of the invention resides in the use of the rigid tube holes being staggered relative to the elastic tube holes.

It is an outstanding advantage of the present invention that the rigid and elastic tubes are easy to construct, to assemble and to operate as a vent valve.

Another important feature of the invention is that the elastic tube expands away from the rigid tube and can hunt for the weakest place in ice surrounding the same and crack it and break it off of the vent valve of the present invention at the said weakest place.

Another outstanding advantage of the present invention is that the vent valve of the invention substantially increases the dumping rate of the three-way valve. This is wholly unexpected because normally any restriction in the exhaust of a valve will slow down rather than speed up the volume rate of flow through the exhaust. Note will be taken that this is especially important in relation to anti-skid braking systems because to prevent a skid, the braking system must act very rapidly.

Another outstanding and unexpected advantage of the present invention is that the staggered holes in the rigid tube increases endurance and useful life. Further, in some cases, the holes in the elastic tube prevent it from ballooning and bursting.

DEFINITIONS

Extremely accurate hole locations are not critical. However, in general, each immediately adjacent pair of holes in the rigid tube will be spaced by an angle $\beta$ defined by the equation $\beta \approx 360/n$ in degrees, where $n$ is the number of the rigid tube holes.

If the elastic tube may be described as having one set of holes, the holes being $m$ in number, and another set of holes, the other set of holes being $p$ in number, the equivalent angular spacing of each pair of adjacent holes in the one set and in the other set of these spacings may be defined by the equations $\Delta \approx 360/m$ in degrees and $\delta \approx 360/p$ in degrees, respectively.

The phrase "holes spaced" is hereby defined for use herein and in the claims to mean that the rigid tube holes do not completely register with the holes in the elastic tube.

What is claimed is:

1. A vent valve comprising: a substantially rigid hollow first body having an enclosing wall providing a substantially rigid air tight enclosure except for inlet means and outlet means in communication with the hollow space inside thereof, said inlet means being provided in order that fluid may be allowed to enter said space and may be subsequently vented therefrom, said outlet means being provided to vent said fluid, said first body having an external surface, said outlet means including at least one hole through said wall and said surface; and a second body including a flexible, elastic membrane mounted in pressure contact with at least that portion of the external surface of said first body which surrounds said hole and in a manner to seal said hole shut, at least a portion of said membrane being responsive to a fluid pressure internal of said first body larger than that external thereof to baloon and to expand away from said first body external surface in a manner to permit fluid flowing outwardly of said hole to be vented outside said first body through a space between said first body external surface and said second body, said membrane having a hole extending completely through the thickness thereof, the hole through said first body external surface being spaced from and completely out of registration with said membrane hole, said membrane hole protecting said membrane from balooning and bursting.

2. The invention as defined in claim 1, wherein said membrane is mounted in a manner such that it lies in tension in at least one direction approximately normal to its thickness dimension over said hole.

3. The invention as defined in claim 2, wherein said membrane is made of a rubber-like material.

4. The invention as defined in claim 3, wherein said cylinder is made of metal.

5. A vent valve comprising: a hollow, rigid first tube having one end closed and an end opposite said one end which is adapted to receive a fluid to be vented, said first tube having a circumferential wall that has an approximately cylindrical external surface with a predetermined axis of revolution, said first tube wall being imperforate except for having $n$ holes extending completely through said wall interrupting said surface, said first tube holes extending through said wall at approximately a single first predetermined same axial position along the length of said first tube between and spaced from said ends thereof, each first tube hole being angularly spaced around said axis from each first tube hole immediately adjacent thereto an angle $\beta$, where $\beta \approx 360/n$ in degrees; and a hollow, flexible, elastic second tube slidably positioned over the said external surface of said first tube, said second tube having an unstressed inside diameter less than the diameter of said surface to provide an interference fit between said tubes to keep said second tube in circumferential tension, said second tube being made of a sheet-like material having a thickness small in comparison to both its length and its unstressed inside diameter, said second tube being imperforate over and around each said first tube hole, said second tube being held by said interference fit in pressure contact with a portion of said surface surrounding each of said first tube holes to seal each said first tube hole shut at least when the pressure of fluid inside said first tube is equal to the pressure of fluid outside thereof, said second tube having a first set of $m$ holes and a second set of $p$ holes extending completely through the wall thereof, but spaced axially from said first tube holes on opposite sides thereof, respectively, all of the holes in said first set being located at an approximately single second predetermined axial position, all of the holes in said second set being located at an approximately single third predetermined axial position, each first set hole being angularly spaced around said axis from each first set hole immediately adjacent thereto an angle $\delta$, where $\delta \approx 360/m$ in degrees, each second set hole being angularly spaced around said axis from each second set hole immediately adjacent thereto an angle $\Delta$, where $\Delta \approx 360/p$ in degrees, said second tube being constructed in a manner such that a pressure of fluid inside said first tube greater than the pressure of fluid outside said first tube causes portions of said second tube between said first tube holes and said second tube holes to balloon and to expand away from said surface to allow fluid inside said first tube to escape from inside said first tube through said first tube holes and ultimately through said second tube holes via a space between said first tube holes and said second tube holes created between said tubes by the said action of said second tube expanding away from said first tube external surface, $n$, $m$ and $p$ each being a positive integer greater than unity.

6. The invention as defined in claim 5, wherein $n = m = p$, the angular location of each hole in one set being the same as the angular location of a respective corresponding hole in the other set, each hole through said second tube having an angular location approximately midway between those of respective corresponding pairs of holes in said first and second sets.

7. The invention as defined in claim 6, wherein said second tube is made of a rubber-like material.

8. The invention as defined in claim 7, wherein said first tube is made of metal.

9. The invention as defined in claim 8, wherein hose clamp means are tightened around a portion of the outside of said second tube between one set of holes and the second tube end closest thereto to hold said second tube portion firmly against said second tube external surface to prevent movement of said second tube portion on said surface.

10. The invention as defined in claim 5, wherein said second tube is made of a rubber-like material.

11. The invention as defined in claim 10, wherein said first tube is made of metal.

12. The invention as defined in claim 5, wherein hose clamp means are tighted around a portion of the outside of said second tube between one set of holes and the second tube end closest thereto to hold said second tube portion firmly against said second tube external surface to prevent movement of said second tube portion on said surface.

13. The invention as defined in claim 5, wherein said first tube external surface has a circumferential groove therein intercepting all of said first tube holes.

14. The invention as defined in claim 13, wherein said surface also has a plurality of longitudinal grooves intercepting said circumferential groove on both sides thereof, at least one longitudinal groove passing beneath each hole in each of said sets.

15. The invention as defined in claim 5, wherein said first tube has a radially outwardly extending projection fixed relative thereto at said closed end thereof, said projection extending to a maximum radius greater than that of said first tube external surface to retain said second tube on said first tube.

* * * * *